June 1, 1937. C. A. NICKLES 2,082,212
OIL GROOVE CUTTING DEVICE
Filed Aug. 25, 1934 3 Sheets-Sheet 2

INVENTOR
Clair A. Nickles
BY Loyal J. Miller
ATTORNEY

June 1, 1937. C. A. NICKLES 2,082,212
OIL GROOVE CUTTING DEVICE
Filed Aug. 25, 1934 3 Sheets-Sheet 3

INVENTOR
Clair A. Nickles
BY Loyd J. Miller
ATTORNEY

Patented June 1, 1937

2,082,212

UNITED STATES PATENT OFFICE 2,082,212

OIL GROOVE CUTTING DEVICE

Clair A. Nickles, Ponca City, Okla.

Application August 25, 1934, Serial No. 741,449

7 Claims. (Cl. 90—24.3)

My invention relates to devices for cutting oil grooves in shaft bearings.

Bearings for shafts usually are provided with through perforations spaced radially opposite to each other for permitting ingress of a lubricant to the journaled portion of the shaft. Superficial grooves are then cut into the inner surface of the bearing for the purpose of insuring proper distribution of the lubricant over the shaft, and these grooves communicate with the inlet perforations.

It has been found that two circular grooves described in different planes and intersecting each other at the inlet perforations of the bearing, reach the desired distribution of the lubricant over the shaft. It will be obvious that when the width of the bearings is increased, the angle at which the circles are described with relation to each other should also be increased in order to cover the additional surface of the shaft properly. Also, that when the diameter of the bearing is increased and the width of the bearing remains constant, the angle of the circles with relation to each other may remain the same.

The prime object of the invention is the provision of a device of this nature which is easily and quickly adjustable to accommodate bearings of various diameters and widths.

Other objects of the invention are to provide a device of the class described which is new, novel, practical and of utility; which may be either power driven or manually operated; which will include an adjustment whereby the circular grooves may be insured to intersect each other at the inlet perforations instead of elsewhere; which is primarily designed for cutting grooves in connecting rod bearings, but which may be designed for cutting grooves in other bearings by simply changing the design of the bearing holding mechanism; which is simple to operate; which is durable; and, which will be efficient in accomplishing all the purposes for which it is intended.

With these and other objects in view as will more fully appear hereinbelow, my invention consists in the construction, novel features, and combination of parts hereinafter more fully described, pointed out in the claims hereto appended, and illustrated in the accompanying three-sheet drawings, of which, Figure 1 is a side elevational view partially in section;

Like characters of reference designate like parts in all the figures.

Figure 1:
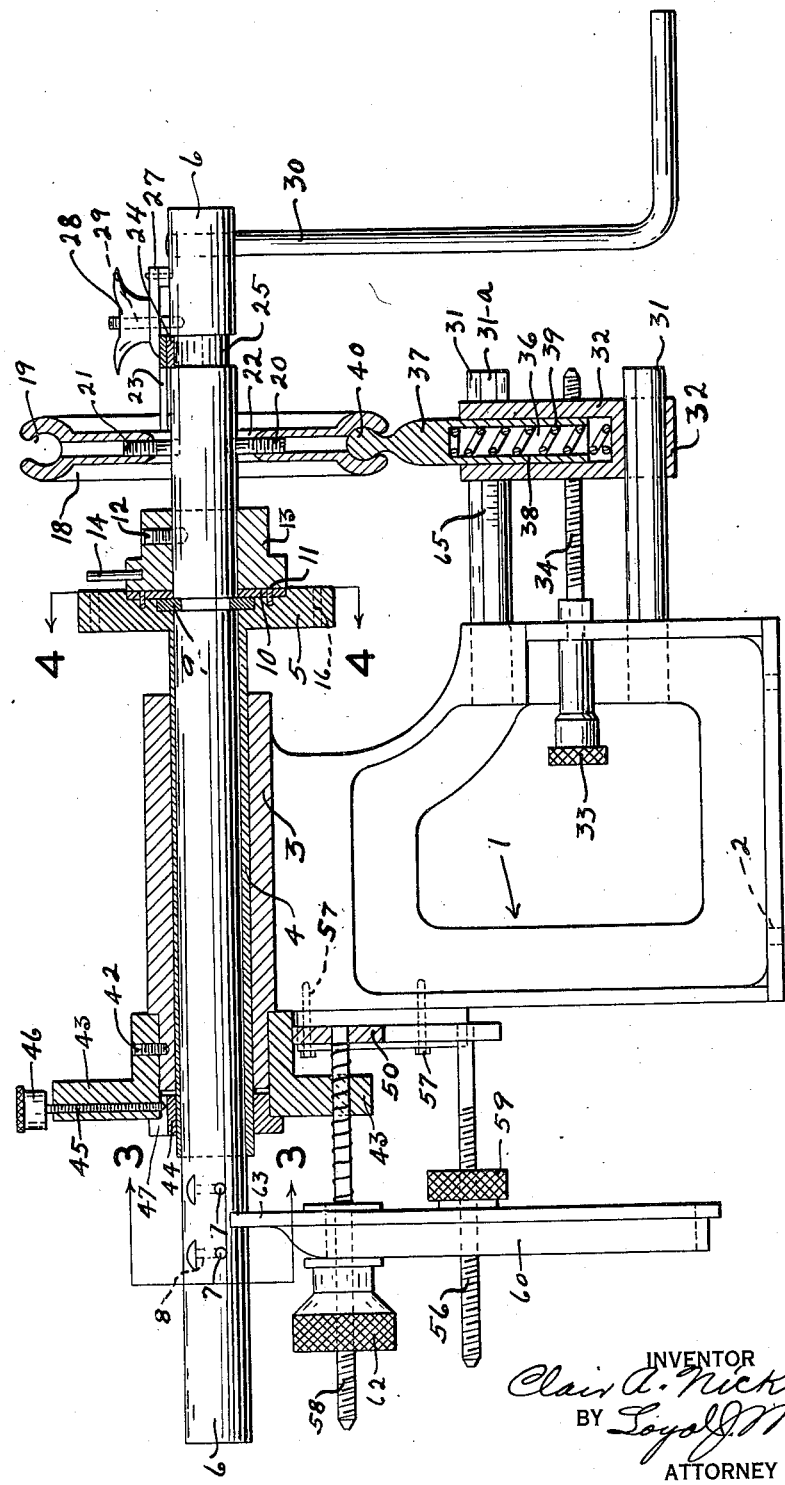

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

The inventive idea involved is capable of receiving a variety of mechanical expressions one of which, for the purpose of illustrating the invention, is shown in the accompanying drawings wherein:—

The reference numeral 1 indicates a supporting frame or standard having perforations 2 for receiving bolts or other retaining means, not shown, by which it may be rigidly attached to a desired base, such as a table or the like, not shown. The uppermost portion of the standard rigidly supports a horizontal tubular element 3 which acts as a bearing for a rotatable eccentric sleeve 4 having an enlarged disc portion 5 upon one end. The sleeve 4 is bored off-center about one-sixteenth of an inch, or the depth to which it is desired the lubricating grooves to cut in the bearing. A perfectly cylindrical shaft 6 is rotatable and slidably journaled within the sleeve 4 and protrudes therefrom at each end for a considerable distance.

The portion of the shaft 6 which protrudes from the left hand end of the sleeve, as illustrated in Fig. 1, is provided with two parallel spaced through perforations each adapted to receive a groove cutting bit 7 held in place by set-screws 8. The portion of the shaft 6 which is in contact with the disc 5 is provided with a superficial annular groove which, together with a groove surrounding the shaft in the right hand face of the disc 5, is adapted to receive an annular key 9. The key 9 is made in halves so that it may be inserted in the groove in the shaft, and is held in place by an annular plate 10 fastened by screws 11 to the disc. This key and plate arrangement permits the shaft 6 to rotate within the sleeve 4 but prevents independent longitudinal movement of the sleeve with relation to the shaft.

Around the shaft 6, against the right hand face of the disc 5, and held in place by a set-screw 12, is a collar 13 having an outwardly projecting rigidly positioned pin 14. The office of the pin 14 is to engage a pin 15 carried by the right hand face of the disc 5 and cause rotation of the disc when the shaft 6 is rotated sufficiently in an anti-clockwise direction. The disc 5 adjacent its edge which lies opposite the pin 15 is provided with a plurality of radially spaced through perforations 16 each adapted selectively to removably receive a tapered pin 17 similar to the pin 15. The row of perforations 16 extend around the disc 5 toward the pin 15 and when the pin 17 is placed in one of the perforations 16, clock-wise rotation of the shaft 6 will cause the pin 14 to contact the pin 17 and cause rotation of the sleeve 4. The office of the perforations 16 and pin 17 will be more fully described hereinbelow.

Spaced a desired distance from the right hand face of the collar 13 and around the shaft 6 is an annular disc 18 having a peripheral superficial groove 19 which is arcuate in cross-section. The disc 18 is mounted upon the shaft 6 by two oppositely positioned set-screws 20 and 21 which prevent independent rotation of the shaft 6 within the disc, but which permit the disc a movement to various angles with relation to the shaft 6 upon the set-screws 20 as an axis. In other words the set-screws 20 act as an axis lying at right angles to the axis of the shaft 6 upon which the disc 18 may be moved as far as is permitted by the size of the central bore 22 of the disc 18. The bore 22 is considerably larger in diameter than the diameter of the shaft, and can therefore be pivoted upon the set-screws 20 and 21 until one side of it assumes approximately a thirty degree angle and the other side a sixty degree angle with relation to the axis of the shaft, instead of constantly assuming a ninety degree angle as is the position shown in Fig. 1. This movement of the disc 18 is illustrated in dotted lines in Fig. 5. The permissible angle of disposition of the disc 18 with relation to the shaft may be increased by enlarging the bore 22.

To the right hand face of the disc 18 at a point slightly above the upper surface of the shaft 6 is rigidly connected by welding or the like two ends of a semi-annular plate 23 which slides, when the disc 18 is moved, upon the upper surface of a shoe 24 which in turn rides in a groove 25 in the shaft 6. The upper surface of the plate 23 is provided with graduations 26 which indicate the angle or position of the disc 18 with relation to the shaft 6. The shaft 6 is provided with a clamp 27 which has a pointed left hand end and which is adapted to clamp the plate 23 to the shoe 24 to prevent movement of the disc 18, as well as acts to indicate certain ones of the graduations 26. The clamp 27 is urged to a clamping position by a thumb-nut 28 carried by a stud-bolt 29 in the shaft 6.

The extreme right hand portion of the shaft 6 is equipped with a crank 30 whereby it may be rotated manually, or the crank may be supplanted by any desired power take off, not shown.

The crank 30 is located upon the shaft 6 at right angles to the axes of the bits 7 so that when the crank is projecting straight downwardly from the shaft, the bits 7 will be in a horizontal position, as illustrated in Fig. 1.

To the right hand edge of the frame 1 is rigidly connected two spaced parallel guide rods 31 having flat portions 31-a upon which is slidably mounted a block 32 having two thumb-screws 35 which act to selectively fasten the block in various positions upon the rods 31. The position of the block 32 with relation to the rods 31 is adjusted by a hand wheel 33 and a threaded rod 34 which engages the block. The thumb-screws 35 must, of course, be loosened before the hand wheel is rotated.

A bore 36 is provided in the upper surface of the block 32, and a pin 37 having a lower tubular portion 38 is slidably mounted in the bore 36 upon a helical spring 39. The upper end of the pin 37 terminates in a substantially spherical head 40 which is slidably engaged by the peripheral groove 19 in the disc 18. Therefore, when the block 32 and pin 37 are held stationary upon the rods 31 by the thumb screws 35, movement of the disc 18 upon the set-screws 20 and 21 as an axis, will move the shaft 6 and sleeve 4 longitudinally within the bearing 3. The disc 5 and collar 13 will, of course, move with the shaft and sleeve.

Figure 2:
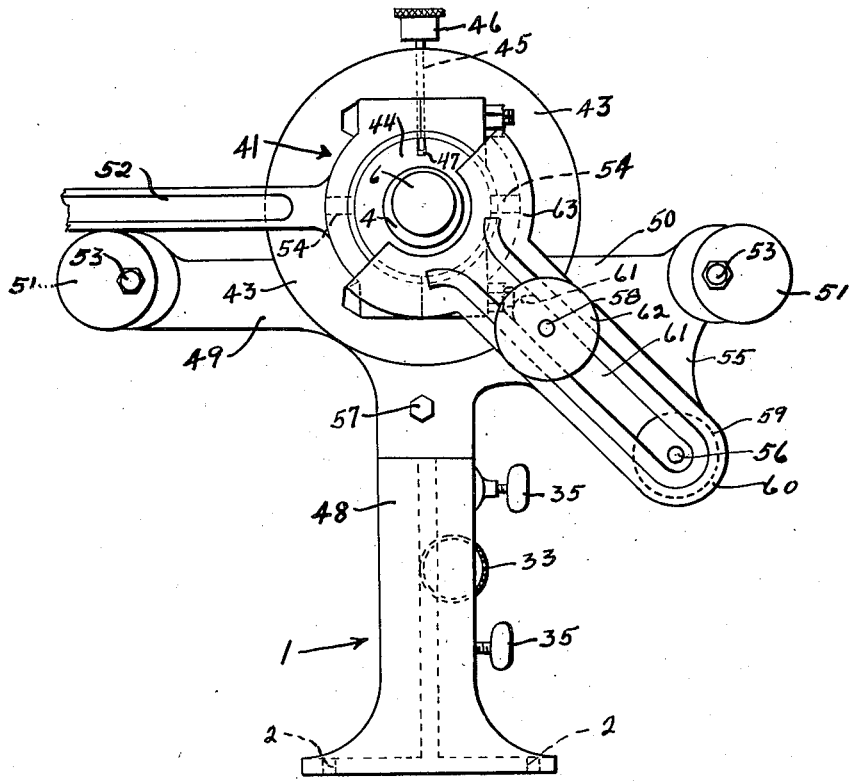
Fig. 2 is an end elevational view looking at the left hand end of Fig. 1, and showing a connecting rod and its bearing in position to be grooved.
Figure 3:
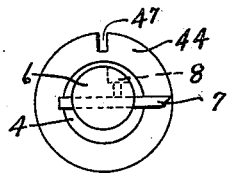
Fig. 3 is a sectional view taken along the line 3—3 of Fig. 1.
Figure 4:
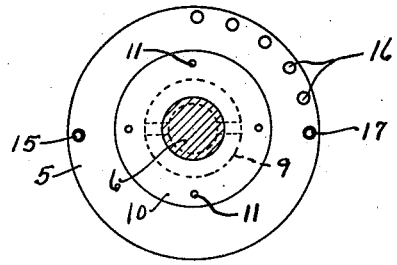
Fig. 4 is a sectional view taken along the line 4—4 of Fig. 1.
Figure 5:
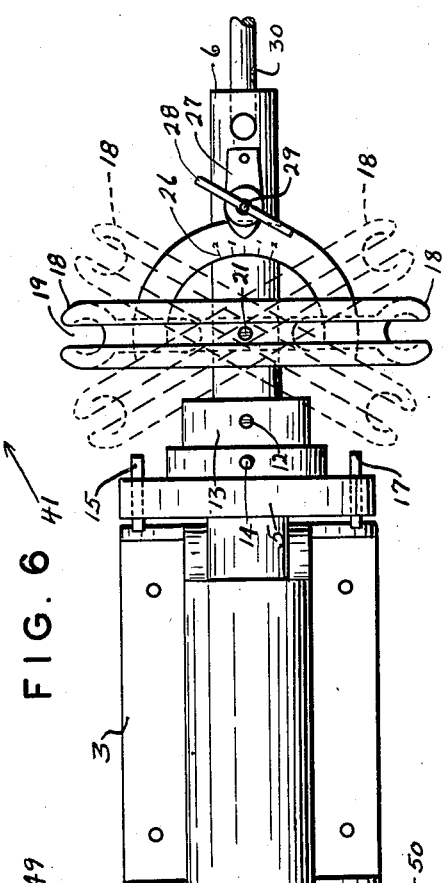
Fig. 5 is a plan view of the device.

As a means for removably holding the bearing to be grooved, the whole of which is indicated by the reference numeral 41 in Figs. 2 and 5, in position to be grooved by the bits 7, the following described structure is provided:

Keyed to the left hand end of the bearing 3 by a set-screw 42 is a facing plate 43. A removable bearing centering bushing 44 is held in contact with the left hand face of the plate 43 and around the left hand end portion of the sleeve 4 by a set-screw 45 having a knurled knob 46 upon its upper end. The bushing 44 has a notch 47 within which the inner end of the set-screw 45 projects. The diameter of the left hand end, or larger portion of the bushing 44 is substantially the same as, or slightly less than, the inside diameter of the bearing 41, and the bushing may be removed and replaced by one of a different diameter when a bearing of different inside diameter is to be grooved. The right hand side edge portion of the bearing should fit snugly yet slidably over the bushing and rest against the left hand face of the plate 43.

To the left hand end of the frame 1 is rigidly attached by a bolt or bolts 57 or made integral, a bracket 48 having oppositely extending outwardly projecting arms 49 and 50. The outer end of each of the arms is provided with an eccentrically mounted cylindrical support 51 for supporting the connecting rod 52 of the bearing 41. The supports are adjustably mounted upon bolts 53 threaded into the arms. The purpose of the supports 51 being eccentrically mounted is in order that the inlet perforations 54 in the bearing 41 may be positioned horizontally regardless of the width of the connecting rod 52. The arm 50 has a downwardly extending projection 55 into which is rigidly connected the right hand end of a threaded rod 56. Between the rod 56 and the shaft 6, the arm 50 is also provided with another threaded rod 58 similar to the rod 56. The axes of the shaft 6, rod 58 and rod 56 lie in a single plane at a tangent to the horizontal axis of the connecting rod 52, and therefore the bearing may be placed over the end of the shaft 6 and around the bushing 44 in positions in which the connecting rod will rest upon either of the supports 51 without interference by the rods 58 or 56. In either position of the bearing, adjustment of the supports 51 will bring the connecting rod 52 into a horizontal position.

An adjustable clamping nut 59 is provided upon the rod 56. A clamping element 60 having a longitudinal through slot 61 is inserted over the free ends of the rods 58 and 56, and another clamping nut 62 is then threaded upon the free end of the rod 58. The upper end of the element 60 is equipped with an arcuate plate 63 which is adapted to contact the left hand face of the bearing 41 and hold it in rigid contact with the facing plate 43. The nuts 59 and 62 act as means for forcing the element 60 into clamping engagement with the bearing 41, and the length of the rods 58 and 56 is such that bearings of various widths may be accommodated. The nuts 59 and 62 may be screwed in opposite directions away from each other when it is desired to release the bearing, after which the element 60 may be moved longitudinally downward and out of contact with the bearing. The bearing may then either be rotated upon the bushing 44 so that the connecting rod will rest upon the opposite support 51, or may be removed over the end of the shaft 6 as desired.

One of the rods 31 is provided with a scale 65 for indicating the longitudinal adjustment of the block 32 with relation to the rods.

Operation

Since the pin 14 operates between the fixed pin 15 and the removable pin 17, and since the pin 15 is positioned radially at a point midway between the thick and thin portions of the sleeve 4, when the shaft 6 is rotated in an anti-clockwise direction, the pin 14 carried by the collar will contact the pin 15 at a point equi-distant between the thick and thin portions of the sleeve 4. When the crank 30 is down, the pin 14 is up, and the bit 7 is in a horizontal position. Movement of the disc 5 and sleeve 4 in an anti-clockwise direction until the pins 14 and 15 contact will bring the thick portion of the sleeve 4 in alinement with the cutting edge of the bit 7. If the bearing 41 is then clamped into position upon the bushing 44, and the bit 7 is set to barely miss contact with the inner surface of the bearing, further rotation in said anti-clockwise direction of the shaft 6 and sleeve 4 will not alter the axial position of the shaft 6 in the bearing 3, and consequently the cutting edge of the bit cannot contact the bearing 41 as long as the shaft is being rotated in said anti-clockwise direction. However, when the shaft 6 is then rotated in a clockwise direction, the shaft 6 will turn within the sleeve 4 until the pin 14 contacts the removable pin 17 in one of the perforations in the disc 5. The relative axial position of the shaft 6 and sleeve 4, as well as the relative axial position of the shaft 6 and the bearing 41 is gradually altered and the cutting edge is brought into a deeper cutting contact with the bearing 41 until the pin 14 contacts the pin 17. After the two last mentioned pins are brought into contact the axial position of the shaft 6 with relation to the bearing 41 and sleeve 4 will not change further regardless of the number of times the shaft is rotated in said clockwise direction. The depth of a groove which may be cut by the bit will therefore be governed by the hole 16 into which the pin 17 is positioned.

After the groove has been cut, the bit 7 may be withdrawn from the groove by rotation of the shaft 6 in an anti-clockwise direction.

During the clock-wise rotation of the shaft 6, if the disc 18 is set with its faces at right angles to the axis of the shaft, a circular groove will be cut in the bearing 41, and the plane of such circle will be parallel to the plane of the disc 18 which in turn is also perpendicular to the axis of the bearing 41. This is caused by the fact that the head of the pin 37 is engaged in the peripheral groove 19 of the disc 18 and the shaft 6 and sleeve 4 are both held against any longitudinal movement during the rotation. The groove thus cut with relation to the side edges of the bearing 41 may be varied by use of the adjusting rod 34.

It may be seen that if during the above described groove cutting operation the disc 18 had been set at an angle with relation to the shaft 6, the groove cut would have been in a plane parallel to the plane at which the disc 18 was set. This would have been caused by the fact that the shaft 6 and bit 7 were forced by the pin 37 and disc 18 to a longitudinal reciprocal motion during their rotation.

In order to illustrate one complete groove cutting operation, let us assume that it is desired to cut lubricating grooves in a connecting rod bearing which bearing measures two inches inside diameter, and one and three-quarter inches in width. It would be decided the width of the bearing is sufficient to justify the grooves being cut in planes diverging sufficiently with relation to each other as to make their greatest distance apart approximately one inch.

A centering bushing 44 would be selected having an outside diameter slightly less than two inches, say one and thirty-one thirty-seconds inches. The bushing would be fastened in place against the left hand face of the plate 43 by the set-screw 45.

The bearing 41 would next be placed over the end of the shaft 6, around the bushing 44, and against the plate 43. The supports 51 would then be adjusted with such relation to the arms 49 and 50 as to bring the perforations 54 in the bearing into horizontal positions when the connecting rod 52 was resting upon either of the supports.

The crank 30 would next be turned to a downward position which would bring the pin 14 in the collar 13 uppermost, and the disc 5 would be rotated clockwise until the pin 15 was in contact with the pin 14. The pin 17 will be inserted within the desired one of the perforations 16. When the sleeve 4 is in this position, the perforations in the shaft 6 for receiving the bit 7 will be in a horizontal position, and will lie in a plane parallel to an imaginary line drawn from the thickest to the thinnest portions of the sleeve 4, which plane will also be parallel to the plane in which the perforations 54 in the bearing 41 are disposed.

The bearing 41 will next be temporarily removed and a bit 7 will be inserted within the perforation in the shaft 6 lying nearest the end of the sleeve 4. The bit 7 will be inserted with its cutting edge pointing in the direction in which the thicker portion of the sleeve 4 is lying. The bearing 41 will then be replaced around the bushing 43 and the bit will be adjusted longitudinally in the perforation and fastened by the set-screw 8 in a position in which the cutting edge is barely clear of the inner surface of the bearing 41.

The disc 18 will next be fastened in a position in which its faces are perpendicular to the shaft 6, or in other words with the point of the element 27 in registration with the zero or center line of the scale 26. The thumb-screws 35 will be loosened and the block 32, shaft 6 and bit 7 will be moved by operation of elements 33 and 34 until the bit 7 is in axial alinement with one of the perforations 54 in the bearing 41, or in the center line of the bearing, after which the thumb-screws 35 will again be tightened.

It was decided above that the width of the bearing 41 was sufficient to permit the grooves being cut in such diverging planes as to bring their greatest distance to approximately one inch apart. Therefore, the thumb-nut 28 will be loosened and the disc 18 will be set at such an angle with relation to the shaft 6 as to bring the numeral 1 of the scale 26 in registration with the point of the element 27, and the thumb-nut 28 will again be tightened.

With the above described adjustments all made, the bearing is in proper position, and the device is in condition to cut the first of the two oil grooves to be made.

The shaft 6 will next be rotated in a clockwise direction by use of the crank 30. During such rotation, the shaft 6 will rotate within the sleeve 4 and the bit will gradually enter the bearing 41 until the pin 14 contacts the pin 17, after which, a complete rotation of the bit will cause the depth of the groove to be made equal throughout. A complete anti-clockwise rotation of the shaft 6 will then be made to withdraw the bit from the groove.

The clamp 60 will then be loosened and the bearing 41 will be rotated partially upon the bushing 44 until the connecting rod 52 rests upon the opposite one of the supports 51. The clamp will then be tightened and the shaft 6 will again be rotated in said clockwise direction. The second clockwise movement of the crank 30 will cut another one of the oil grooves with the cutting end of the bit traveling in the same plane as before, but the groove will be cut in an opposite plane with relation to the bearing 41 due to the fact that it is disposed with its connecting rod one hundred and eighty degrees from its former position.

Figure 6:
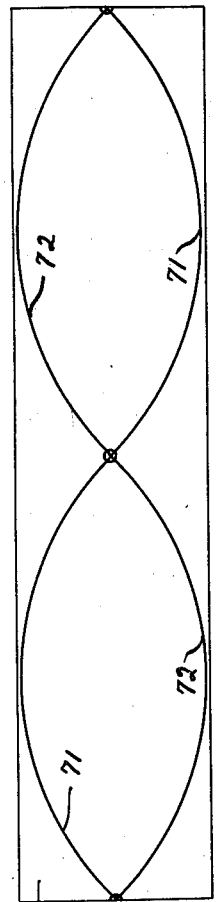
Fig. 6 is a plan view showing the development of the inner surface of a bearing after the lubricating grooves have been cut by the device.

In Fig. 6 the reference numeral 70 indicates the inner surface of the bearing 41. The reference numeral 71 indicates one of the circular grooves cut in the bearing with the connecting rod 52 disposed upon one of the supports 51, and the reference numeral 72 indicates another circular groove cut by the device with the connecting rod 52 resting upon the opposite one of the supports 51.

From the foregoing description it may be seen that a device has been provided which will permit a setting of the cutting tool at various positions with relation to the bearing to be operated upon without removal of the bearing from the device; which will permit a setting of the cutting tool to various positions with relation to the work without removal of the cutting tool from its holding means; which will permit the adjustment of a lengthwise travel of the cutting tool without removing the tool from its holding means and without removing the work from the device; a device which will permit adjustment to cut grooves at various depths without adjustment of the cutting tool with relation to its holding means and without removal of the work from the device; and, a device which will permit the cutting of identical grooves in a successive number of bearings without any re-adjustment of either the tool or its holding means and without removal of the tool.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is:

1. In groove cutting apparatus for bearings, the combination with a groove cutting element carried by a rotatable detenture, of a centering means for a bearing including: a rigidly positioned member having a face perpendicular to the axis of the detenture and against which the bearing may be placed when in a position to be grooved, and a removable bearing centering element carried rigidly by the member for receiving thereover the bearing to be grooved.

2. In groove cutting apparatus for bearings, the combination with a groove cutting element carried by a rotatable detenture, of a centering means for a bearing including: a rigidly positioned member having a face perpendicular to the axis of the detenture and against which the bearing may be placed when in a position to be grooved, a removable bearing centering element carried rigidly by the member for receiving thereover the bearing to be grooved, and means for removably holding the bearing against the face of said member and over the centering element.

3. Organization as described in claim 1, in which the bearing may be rotated upon the centering member and means for holding it in any desired radial position thereon.

4. In groove cutting apparatus for bearings, a support, an eccentric sleeve having a cylindrical bore and journaled in said support, a cylindrical shaft adapted for independent rotation within but held against independent longitudinal movement with relation to said sleeve, a transversely positioned groove cutting bit adjustably carried by one end of the shaft exteriorly of the sleeve, a rigidly positioned plate carried by the support and having a face lying perpendicular to the axis of the shaft and against which a bearing to be grooved may be placed, a removable bearing centering element rigidly carried by the member for rotatably receiving thereover the bearing, means for removably holding the bearing over said centering element and against said face in various radial positions, and means for imparting simultaneous rotation and longitudinal reciprocation to the shaft and sleeve.

5. Organization as described in claim 4, and means for adjusting the relative radial positions of said sleeve and shaft during their rotation.

6. In groove cutting apparatus for bearings, a support, an eccentric sleeve having a cylindrical bore and journaled in said support, a cylindrical bit carrying element within said sleeve and adapted for independent rotation but held against independent longitudinal movement with relation thereto, a bit adjustably carried by the element, bearing holding and centering means carried by the support adjacent the bit, and means for imparting simultaneous rotation and longitudinal reciprocation to the element and the sleeve.

7. Organization as described in claim 6, and means for adjusting the relative radial positions of said element and said sleeve during their rotation.

CLAIR A. NICKLES.